United States Patent [19]

Bergmann et al.

[11] Patent Number: 4,723,574
[45] Date of Patent: Feb. 9, 1988

[54] SANITARY WATER FITTING

[75] Inventors: Konrad Bergmann; Hans W. Thullen, both of Wittlich, Fed. Rep. of Germany

[73] Assignee: American Standard Inc., New York, N.Y.

[21] Appl. No.: 880,377

[22] Filed: Jun. 30, 1986

[30] Foreign Application Priority Data

Jun. 29, 1985 [DE] Fed. Rep. of Germany ....... 3523350
Jun. 29, 1985 [DE] Fed. Rep. of Germany ... 8518983[U]

[51] Int. Cl.⁴ .................... F16K 11/06; F16K 31/72
[52] U.S. Cl. ........................ 137/625.17; 137/625.4; 251/54; 251/64
[58] Field of Search .......... 137/625.17, 625.4, 625.41, 137/801, 802; 251/48, 54, 64; 188/282, 317

[56] References Cited

U.S. PATENT DOCUMENTS

| | | | |
|---|---|---|---|
| 697,662 | 4/1902 | Reese | 251/54 |
| 907,951 | 12/1908 | Barr | 251/64 |
| 1,298,849 | 4/1919 | Wolff | 251/54 |
| 2,557,287 | 6/1951 | Hormann | 251/54 |
| 2,781,519 | 2/1957 | Marchant | 251/54 |
| 3,102,711 | 9/1963 | Filliung | 251/54 |
| 3,116,917 | 1/1964 | Cramer | 251/54 X |
| 4,112,966 | 9/1978 | Carlson | 251/54 X |

FOREIGN PATENT DOCUMENTS

| | | | |
|---|---|---|---|
| 1127723 | 4/1962 | Fed. Rep. of Germany | 251/54 |
| 2908882 | 9/1980 | Fed. Rep. of Germany | 251/54 |

Primary Examiner—Alan Cohan
Assistant Examiner—John Rivell
Attorney, Agent, or Firm—James J. Salerno, Jr.; Robert G. Crooks; John P. Sinnott

[57] ABSTRACT

A damping means for controlling the closing action of a sanitary fitting to lengthen its closing time and, thereby, reduce its closing speed, is disclosed. The damping means is operatively mounted between the handle and valve control unit assemblies.

2 Claims, 4 Drawing Figures

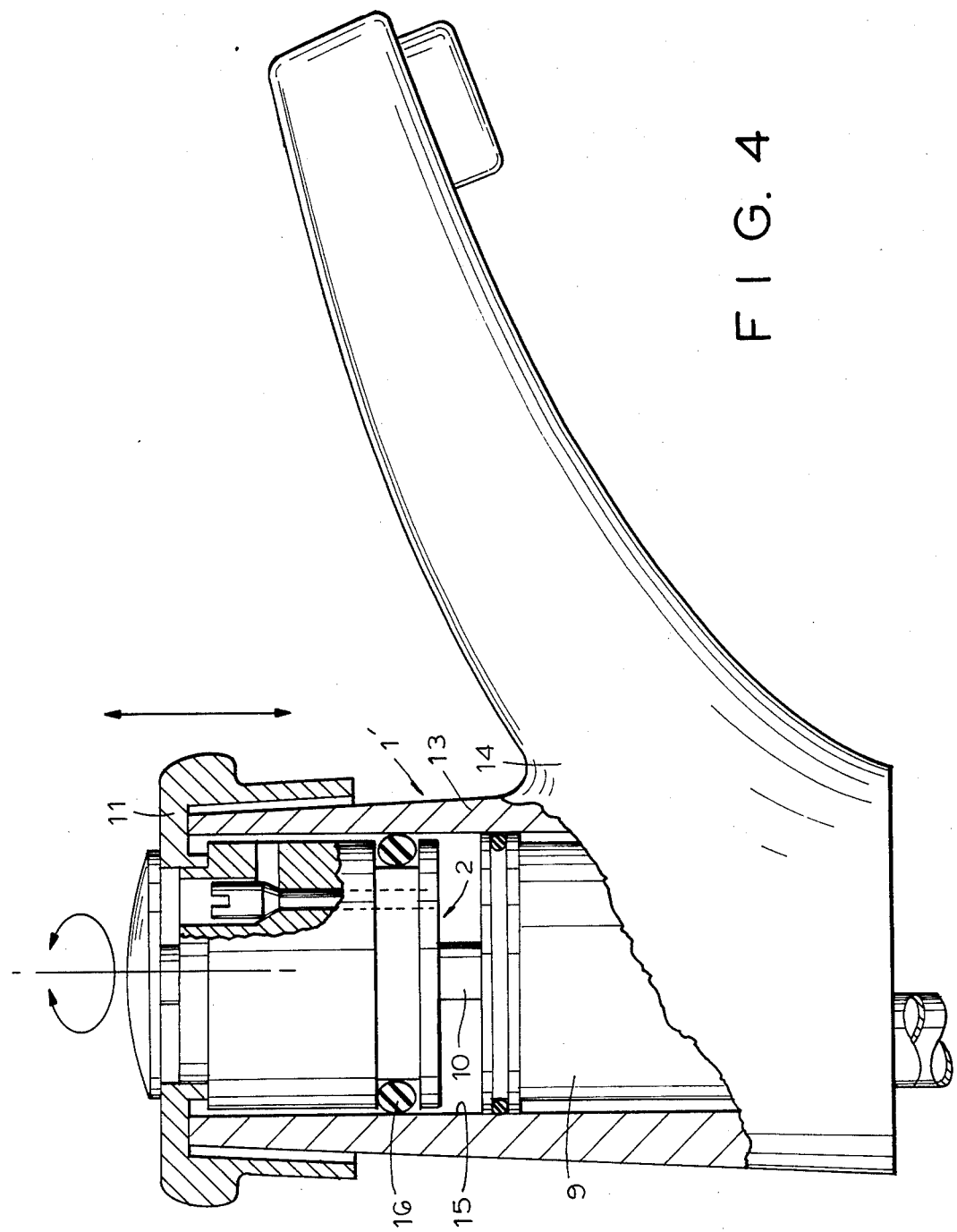

SANITARY WATER FITTING

BACKGROUND OF THE DISCLOSURE

FIELD OF THE INVENTION

The invention relates to a sanitary water fitting, particularly, in the form of a single handle mixer valve assembly with a control unit comprising discs, a piston, balls or the like, and with a damper for the closing action, to lengthen the closing time and reduce the closing speed.

Single handle mixer valve assemblies are usually provided with valve control units fitted with aluminum oxide discs, balls or pistons. They are generally provided with a handle in the form of a lever or a knob to adjust water volume and temperature. Such valve assemblies are increasing in popularity since they are simple to operate and can control the water volume and temperature rapidly.

An obvious step carried out for economic reasons and to simplify the installation is to keep the cross-sections of the pipes leading to the fittings as small as possible. Efforts in this direction are aided by use of plastic pipes, the so-called "pipe within pipe". Here, the source is a distributor serving one flat. Each fitting is separately connected and the cross-sections required to supply the fittings are relatively small in view of the flow volumes, accordingly, correspondingly high water speeds are encountered. If such installations are fitted with single handle mixer valve assemblies, which generally shut off water very quickly, this may result in pressure shock. On the one hand, these may make an annoying noise and, on the other hand, certain pressures must not be exceeded since there would otherwise be excessive strains on the components of the system. These pressure shocks are also known as "water hammer".

Water hammer may be corrected by reducing the rate of flow in the pipe, thereby reducing the sound level; or by shortening the amplitude of the pressure wave, such as by providing means to increase time required to close the valve.

Reducing the flow velocity of a pipe is not desirable. The sound level of water flow achieved by plastic pipe water systems is lower than metal pipe and, therefore, cannot be reduced further. The pipe length has no effect on the length of the sound wave produced by the pipe. It is possible by use of air chamber-like fittings to reduce the inherent resonance of the pipe; however, this does not effect the sound level in the pipe. Piston pumps use such fittings and can be distributed over the length of the pipe; however, such fittings are expensive and are not reliable in operation because of possible air leakage in the system. It is possible to limit the increase time required to shut the valve by extending its actuating distance; however, this is not always desirable. Such devices to increase the closing time and to reduce the closing rate of the fittings are in the form of shock absorbers and are used in water supply systems, in industrial fittings, as well as in single handle mixer valve assemblies. A known assembly of this type, with control elements in disc form, provides for the movable sealing disc to be delayed by coupling a damper assembly to it. A disadvantage of such a solution is that the damper components inside the water fitting transmit sound created by naturally strong damping forces. Another disadvantage is that such a damper assembly for reducing the closing action is not easily repairable, nor is it generally replaceable.

SUMMARY OF THE INVENTION

An object of the invention is to provide a sanitary water fitting of the above type, where the damper means for affecting the closing time of the valve is constructed separately from the valving components that control or guide the water.

Another object of the invention is to provide damping means in which the damping forces are not transmitted by valving components of the fitting.

A further object of the invention is to provide a damping means for a mixer valve assembly that is easy to replace or repair, and reliable in operation.

The several objects are achieved by providing a damper means between the handle and the control unit or between the handle and the fitting casing.

BRIEF DESCRIPTION OF THE DRAWINGS

Two examples of the invention are illustrated in the accompanying drawings in which:

FIGS. 3 and 4 are elevational views, partly in section of a single handle valve mixer of a piston type, shown in its opened and closed positions, respectively.

DETAILED DESCRIPTION OF THE PREFERRED EMBODIMENTS

Figure 1:
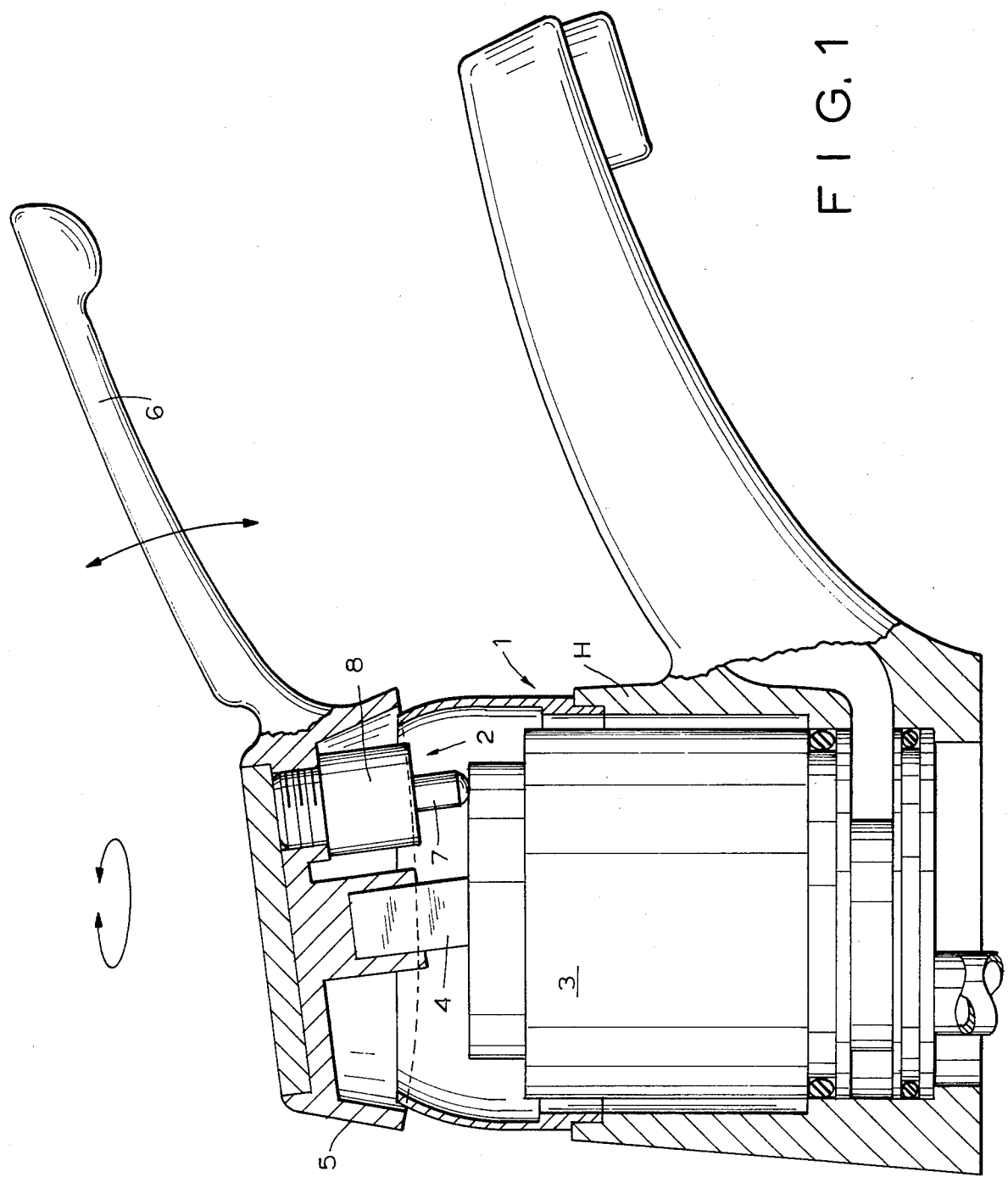
FIGS. 1 and 2 are elevational views, partly in section, of a single lever valve fitting of a disc type, shown in its opened and closed position, respectively.
Figure 2:
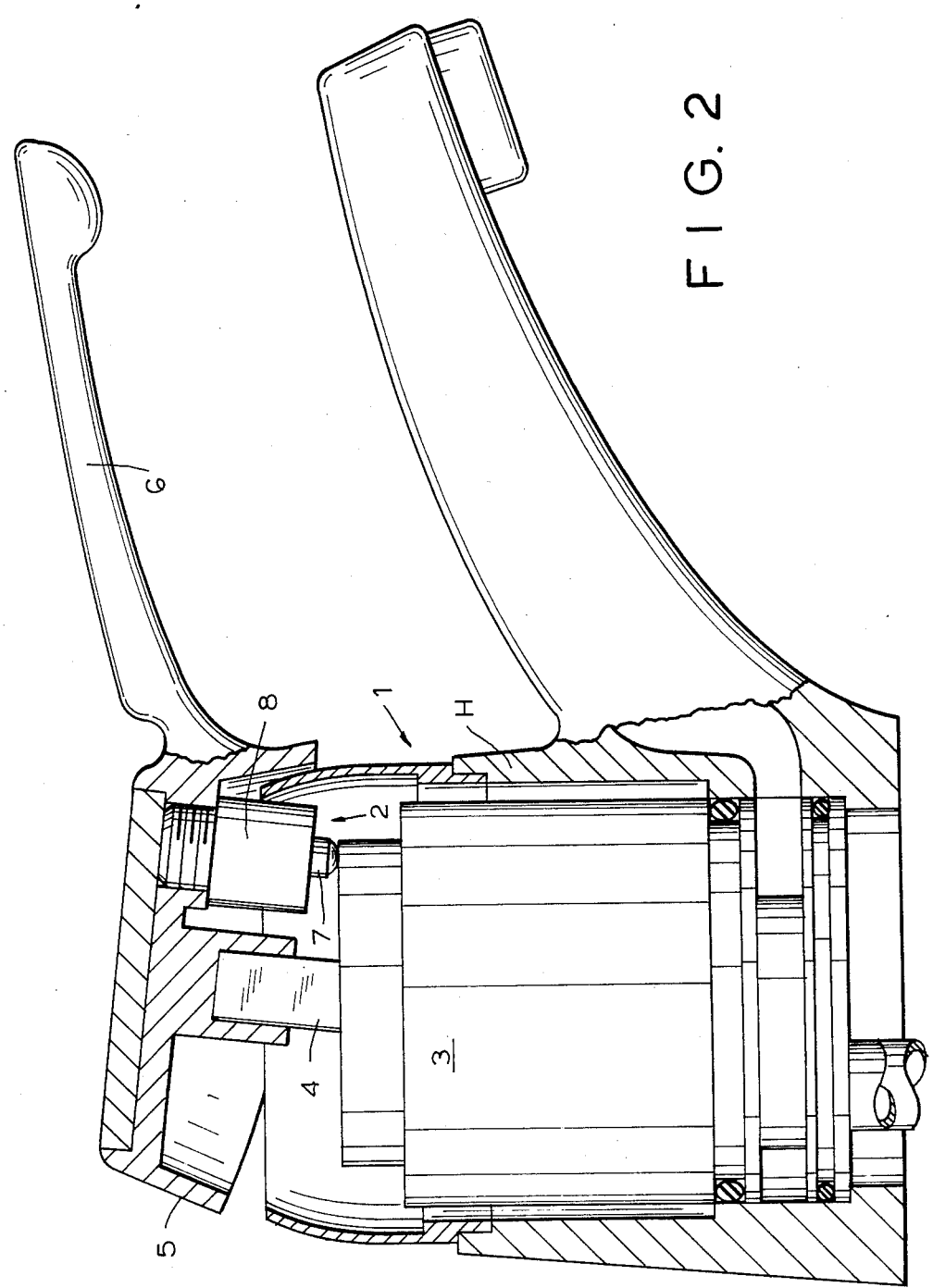

FIGS. 1 and 2 illustrate a single lever mixer valve 1, of the lavatory type, and is shown in its opened and closed positions, respectively. Mixer valve 1 includes a control unit 3 having flat plates or discs as the valving mechanism, not shown. Control units of this type are shown in DT-AS 15 50 060. Control unit 3, mounted in valve housing H, is connected by a control lever 4 to cap-shaped portion 5 of hand lever 6. Hand lever 6 is pivotally coupled to control unit 3 and is shiftable vertically to adjust the water volume, and is rotatable to adjust the water temperature.

A damping means 2, to control the closing action of the valve assembly 1, includes a rod-shaped piston 7 and a cylinder 8 which is mounted to the underside of cap-shaped portion 5 of hand lever 6. The outer end of piston 7 is biased against the top of control unit 3.

Figure 3:
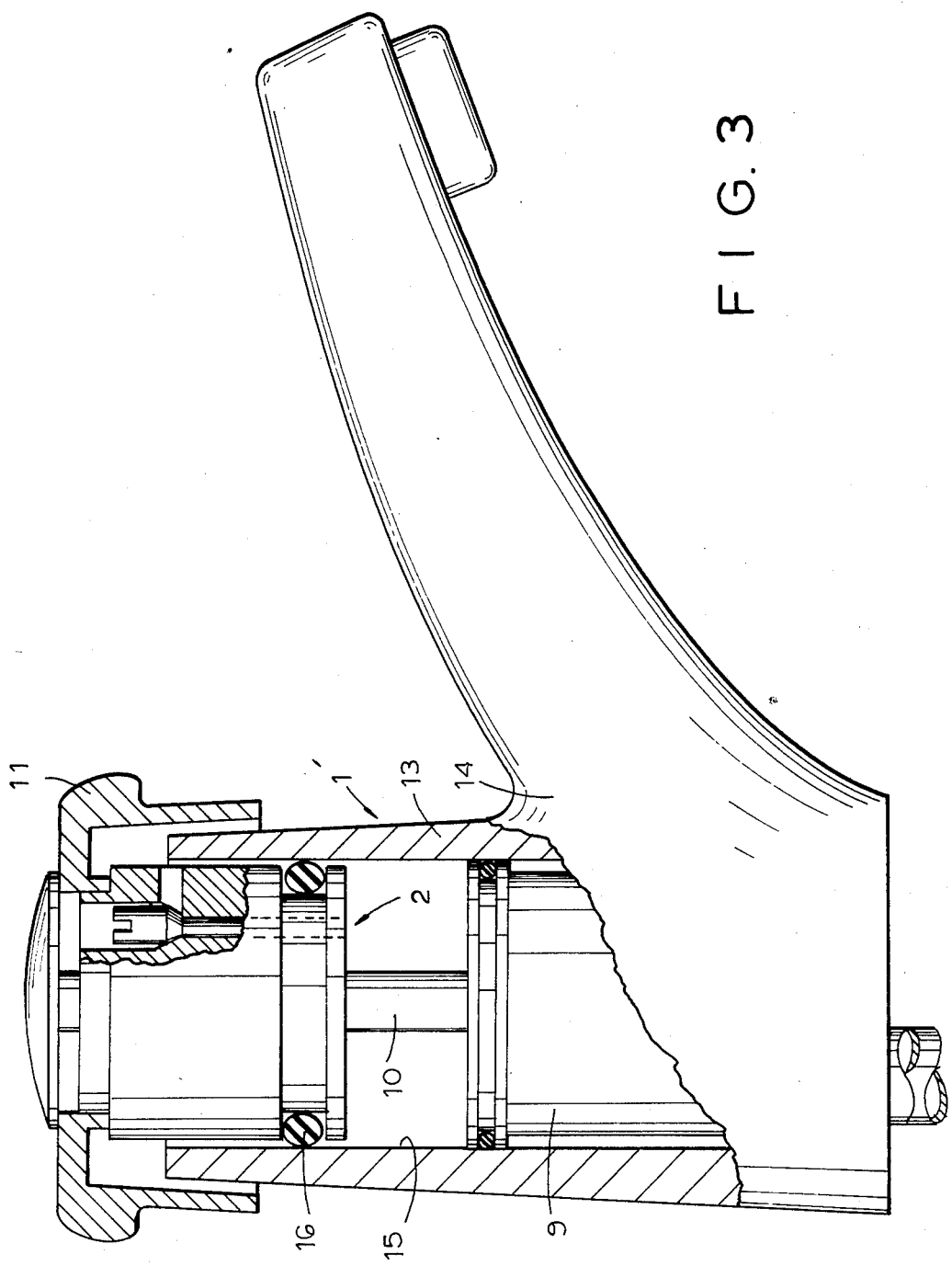

FIGS. 3 and 4 illustrate a single-handle mixer valve 1', of the lavatory type, and is shown in its opened and closed positions, respectively. Mixer valve 1' includes a piston-type control unit 9 and is mounted in valve casing 14. Such piston-type control units are shown in DT-OS 32 24 991. Control unit 9 is operably coupled to a control lever 10 and to a cap-shaped handle 11. A damper means 2', for controlling the closing action of valve assembly 1', is operably coupled between the under surface of cap-shaped handle 11 and control unit 9. Damper means 2' includes a piston 12, which is housed in the underside of cap-shaped handle 11, or may be formed integral therewith, while cylinder 13 is housed in casing 14 of fitting 1', or may be integral therewith. The piston is mounted in sliding sealing engagement with the inner wall surface 15 of cylinder 13 by O-ring 16.

In operation, water volume of fittings 1,1' is adjusted by shifting cap-shaped handles 11 vertically, while the temperature is adjusted by rotating the handles, as illustrated in the direction of the arrows in FIGS. 1 and 4.

Damping means 2,2' control the closing action of valve assemblies 1,1' by compressing air in cylinders 8,13 by pistons 7,12. Valve assemblies 1,1', made in accordance with the present invention, and having damping means 2,2', permit the closing action to be uniform in speed, thereby increasing the closing time, and reduce the closing speed, without any inconvenience to the user. Further, water hammer generally attributed to the fast closing action of various assemblies is obviated.

The valve assemblies described and illustrated herein, of the present invention, are by way of example only. It is obvious that variations of design and operation are possible without departing from the invention herein, for example, damping means may be provided for valve fittings having a cold water valve and a hot water valve.

It is claimed:

1. A sanitary water fitting having a valve control assembly, positioned in a valve housing, operably coupled to a handle assembly, said sanitary water fitting comprising:

a damping means to control the closing action of the handle assembly by increasing the time required to shift said valve control assembly from its on to its off position, said damping means positioned between the handle assembly and said valve control assembly, and being operably coupled therebetween; and said damping means including a piston and cylinder, said cylinder being mounted to the underside of said handle assembly, and said piston being reciprocally mounted therein so that a free end of said piston biases against the top of the valve control assembly to reduce the closing speed of the handle assembly when the valve is shifted between its on and off positions.

2. The sanitary water fitting, according to claim 1, wherein said damping means is replaceably mounted in said handle assembly.

* * * * *